United States Patent
Ford

(10) Patent No.: US 6,951,532 B2
(45) Date of Patent: Oct. 4, 2005

(54) METHOD OF FOLDING AN AIRBAG CONTAINING SENSOR TAPES INTEGRATED WITHIN THE AIRBAG

(75) Inventor: Brian Ford, Mt. Clemens, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 267 days.

(21) Appl. No.: 10/434,176

(22) Filed: May 9, 2003

(65) Prior Publication Data

US 2004/0222622 A1 Nov. 11, 2004

(51) Int. Cl.[7] .............................. B31F 1/00; B60R 21/16
(52) U.S. Cl. ........................ 493/407; 493/457; 493/464; 280/735; 280/743.2
(58) Field of Search ............................... 493/405, 407, 493/451, 457, 464; 260/734, 735, 739, 743.1, 743.2; 53/429

(56) References Cited

U.S. PATENT DOCUMENTS

| | | | | |
|---|---|---|---|---|
| 5,997,037 A | * | 12/1999 | Hill et al. | 280/743.2 |
| 6,129,379 A | | 10/2000 | Specht | 280/735 |
| 6,241,282 B1 | | 6/2001 | Specht | 280/743.1 |
| 6,250,677 B1 | * | 6/2001 | Fujimura | 280/743.2 |
| 6,327,838 B1 | * | 12/2001 | Maul et al. | 53/429 |
| 6,511,094 B2 | * | 1/2003 | Thomas et al. | 280/743.2 |
| 6,547,279 B1 | * | 4/2003 | Amamori | 280/743.1 |
| 6,588,179 B2 | * | 7/2003 | Haley et al. | 53/429 |
| 6,616,184 B2 | * | 9/2003 | Fischer | 280/735 |
| 6,619,015 B2 | * | 9/2003 | Arwood et al. | 53/429 |
| 6,623,034 B2 | * | 9/2003 | Dietsch et al. | 493/405 |
| 6,676,158 B2 | * | 1/2004 | Ishikawa | 280/743.1 |
| 6,779,813 B2 | * | 8/2004 | Lincoln | 280/743.1 |
| 6,789,819 B1 | * | 9/2004 | Husby | 280/735 |
| 6,811,183 B1 | * | 11/2004 | Serban et al. | 280/735 |

FOREIGN PATENT DOCUMENTS

EP  0990567  4/2000

OTHER PUBLICATIONS

Pending U.S. Appl. No. 10/321,524, filed Dec. 18, 2002.
Pending U.S. Appl. No. 10/359,257, filed Feb. 6, 2003.
Pending U.S. Appl. No. 10/419,949, filed Apr. 22, 2003.
Pending U.S. Appl. No. 10/391,577, filed Mar. 20, 2003.
Pending U.S. Appl. No. 10/369,697, filed Feb. 21, 2003.

* cited by examiner

Primary Examiner—Louis Huynh
(74) Attorney, Agent, or Firm—Lonnie Drayer

(57) ABSTRACT

An airbag is folded by attaching a line located inside the airbag to a front side an airbag and extending the line across a guide. The airbag is then compacted around the guide and the line. The line is then placed in communication with a sensor. The line may be a flexible element having an optical pattern read by the sensor. During the folding process, the line may be reeled into a sensor housing.

18 Claims, 7 Drawing Sheets

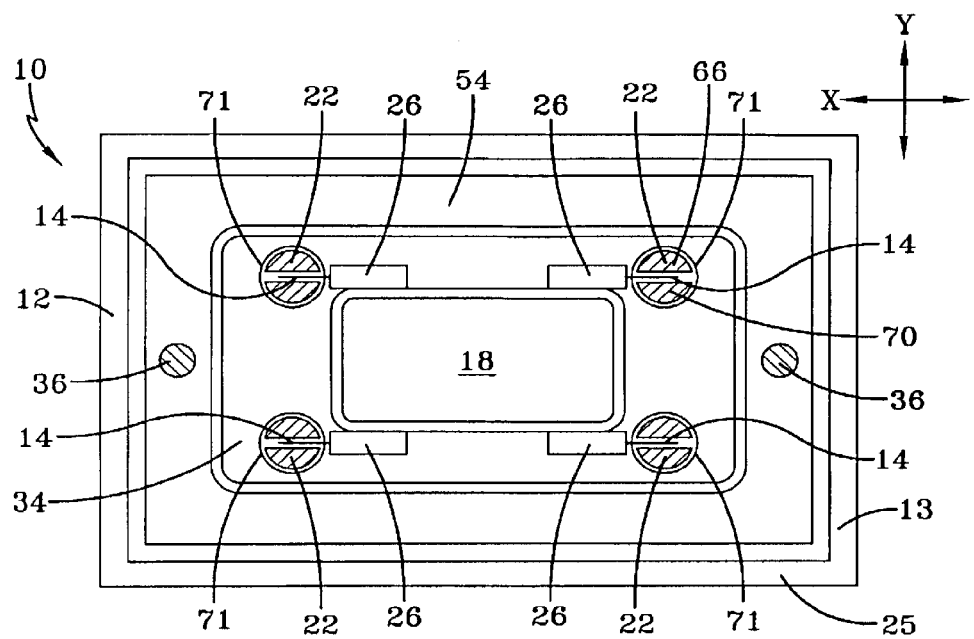
FIG-5
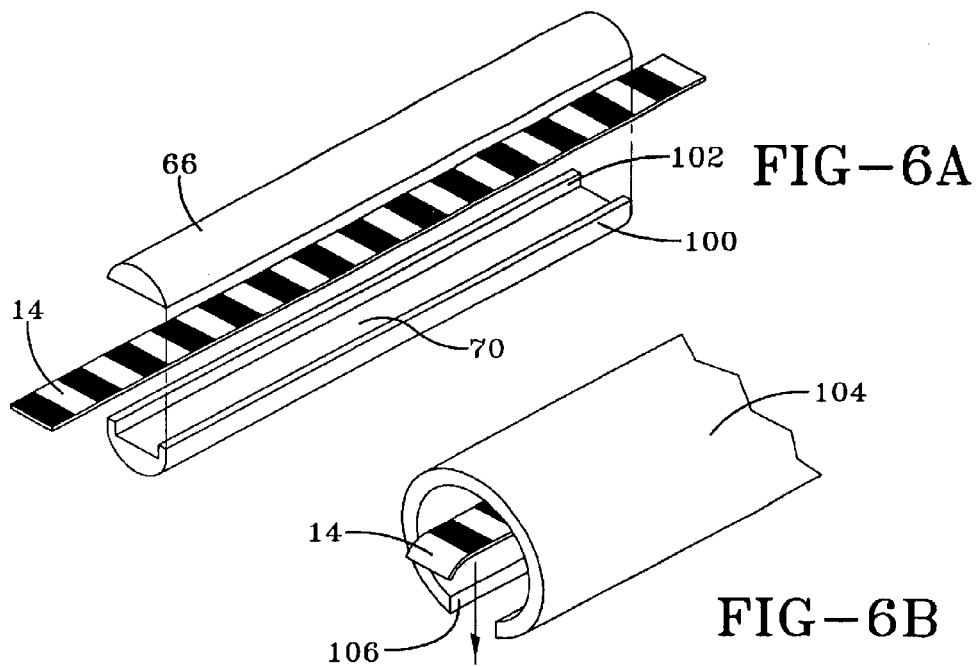
FIG-6A
FIG-6B

US 6,951,532 B2

METHOD OF FOLDING AN AIRBAG CONTAINING SENSOR TAPES INTEGRATED WITHIN THE AIRBAG

FIELD OF THE INVENTION

This invention relates to a method for folding an airbag.

BACKGROUND OF THE INVENTION

An airbag module typically comprises an airbag and an airbag inflator. In the event of a severe vehicle crash, a crash detection system instructs the airbag module to deploy the airbag. The inflator will then provide gas to inflate the airbag. The airbag increases rapidly in volume to cushion the impact of the crash for a vehicle occupant.

The position of the vehicle occupant in relation to the airbag may affect the effectiveness of the airbag as a cushion. For example, if a vehicle occupant is too close to the airbag, full inflation of the airbag may provide less than optimal cushioning. It is therefore desirable to inflate the airbag based on the position of the vehicle occupant.

Systems are known that detect the position of the vehicle occupant and inflate the airbag to an optimal level based on this position. One such system is taught in U.S. Pat. No. 6,129,379 and determines the location of a vehicle occupant based on the rate of inflation of the airbag. At least one sensor tape is located inside of the airbag and is attached to the front side of the airbag. During airbag deployment, these tapes extend with the airbag. A vehicle occupant close to the airbag will interfere with the movement of the front side of the airbag and consequently movement of the sensor tapes. By determining the rate of movement of these tapes, sensors in the airbag module can detect the position of the vehicle occupant and provide this information to a control unit. The control unit system may then adjust the level of inflation of the airbag to accommodate for the vehicle occupant's position.

For such a system, the starting location of the sensor tapes is important to determining the rate of expansion of the airbag and accordingly the position of the vehicle occupant. However, when the airbag is folded using known methods, the airbag may create undesirable folds in the sensor tapes. These folds may disturb the location of these sensor tapes within the airbag and prevent the system from correctly gauging the speed of deployment of the airbag. Consequently, the system may not determine the correct location of the vehicle occupant.

A need therefore exists for an improved airbag folding method that does not disturb the position of the sensor tapes within the airbag.

SUMMARY OF THE INVENTION

The invention comprises a method and apparatus for folding an airbag having sensor tapes located therein. In contrast to prior art folding methods, each sensor tape is extended across a guide, which retains the sensor tape's original form and location. The guide may be a pair of elongated members that sandwich the sensor tape between them. The airbag is then folded around the guide and the enclosed sensor tape. Because of the extension of the sensor tape along the guide, the airbag is folded without enveloping the sensor tape within its folds. This new method prevents the folds of the airbag from disturbing the location of the sensor tapes.

During the folding process, the sensor tapes may be fed into a sensor housing located near the rear of the airbag. The sensor tape may be reeled into the housing as the airbag is folded to take up any slack in the sensor tape. With the sensor tape wound within the housing and the airbag folded around the guides, the guides may then be removed from the airbag. The folded airbag is then wrapped with a cover for placement into an airbag module.

The airbag may be compacted along the length of the guide. Alternatively, the airbag may be compressed from the sides of the guide. The guide in either instance prevents the sensor tape from being disturbed by the airbag folding process.

The invention also includes an apparatus for folding an airbag. An airbag folding apparatus according to the present invention has a chamber to receive an airbag. The chamber has a wall that slides within the chamber to compress the airbag. However, in contrast to existing airbag folding devices, the airbag folding apparatus according to the present invention has guide members spaced within the chamber to receive each sensor tape. The guide may comprise two elongated members that are spaced apart to form a slot to receive the sensor tape. The folding apparatus may permit compression of the airbag along the guide. In addition, compression of the airbag may be from both sides of the airbag and guide.

BRIEF DESCRIPTION OF THE DRAWINGS

FIG. 5 is a top view of the apparatus of FIGS. 1, 2 and 4.

FIG. 6A is a perspective view of the placement of sensor tape within guides of the invention of FIGS. 1, 2 and 4.

FIG. 6B is a perspective view of the placement of sensor tape within an alternative guide of the invention of FIGS. 1, 2, and 4.

DETAILED DESCRIPTION OF THE INVENTION

Figure 1:
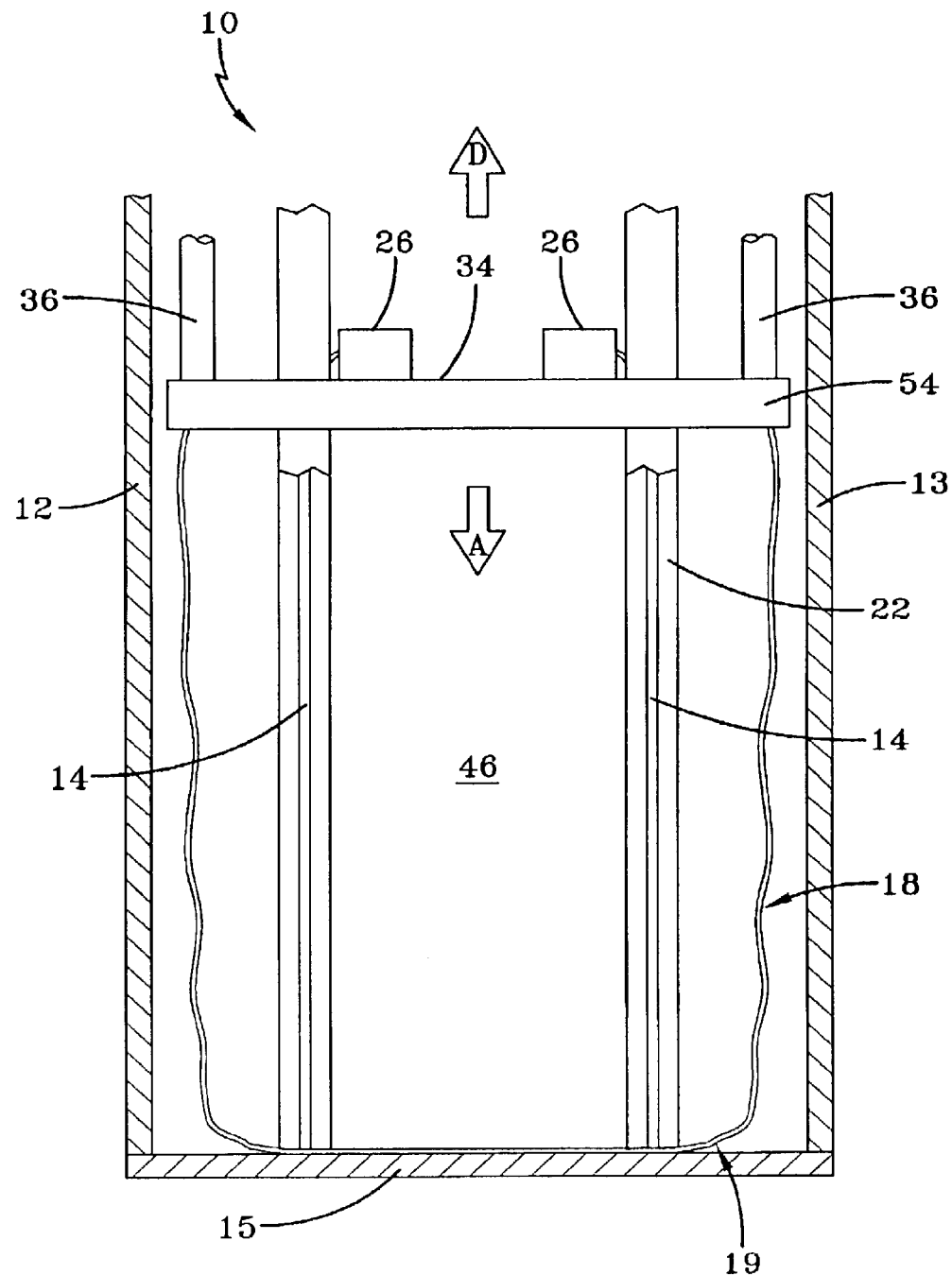
FIG. 1 is a cross-sectional view of an airbag folding apparatus according to the present invention.

FIG. 1 is a cross-sectional view of an airbag folding apparatus 10. Here, the airbag 18 is shown in an extended position within a folding chamber 46, which has a first wall 12, a second wall 13 and a third wall 15 as shown. Two other walls that are not shown cooperate with the first wall 12, the second wall 13 and the third wall 15 to form a box-shaped chamber to receive an airbag 18.

Also within the folding chamber 46 is a moveable plate 54, which may move along the first wall 12 and second wall 13 toward the third wall 15 in the direction indicated in the drawing by an arrow A. The plate 54 serves to compress and thereby fold the airbag 18. Push rods 36 are attached to the plate 54 and permit the plate to be move in the direction indicated in the drawing by an arrow A. The plate 54 may be removed from the folding chamber 46 by moving the push rods 36 in the opposite direction as indicated in the drawing by an arrow D, following folding of the airbag 18.

As shown, the airbag 18 has lines 14 inside the airbag attached to the front 19 of airbag. As used herein and in the claims the "front" of an airbag is a side of the airbag that is intended to encounter a vehicle occupant. The lines 14 may be sensor tapes, such as a flexible element having optical pattern 17 (see FIG. 4), which are read by an optical sensor located in a sensor housing 26. The lines 14 may also be tether lines that attach to sensor tapes located in the sensor housing 26. In the case that the lines 14 are sensor tapes, the lines may extend from the front 19 of the airbag 18 to sensor housings 26. In the case that the line s 14 are tethers, the lines 14 will extend only a short length from the front of airbag 19. In addition, in FIG. 4, the airbag 18 is shown with two lines 14, but more or fewer lines may be needed.

Figure 2:
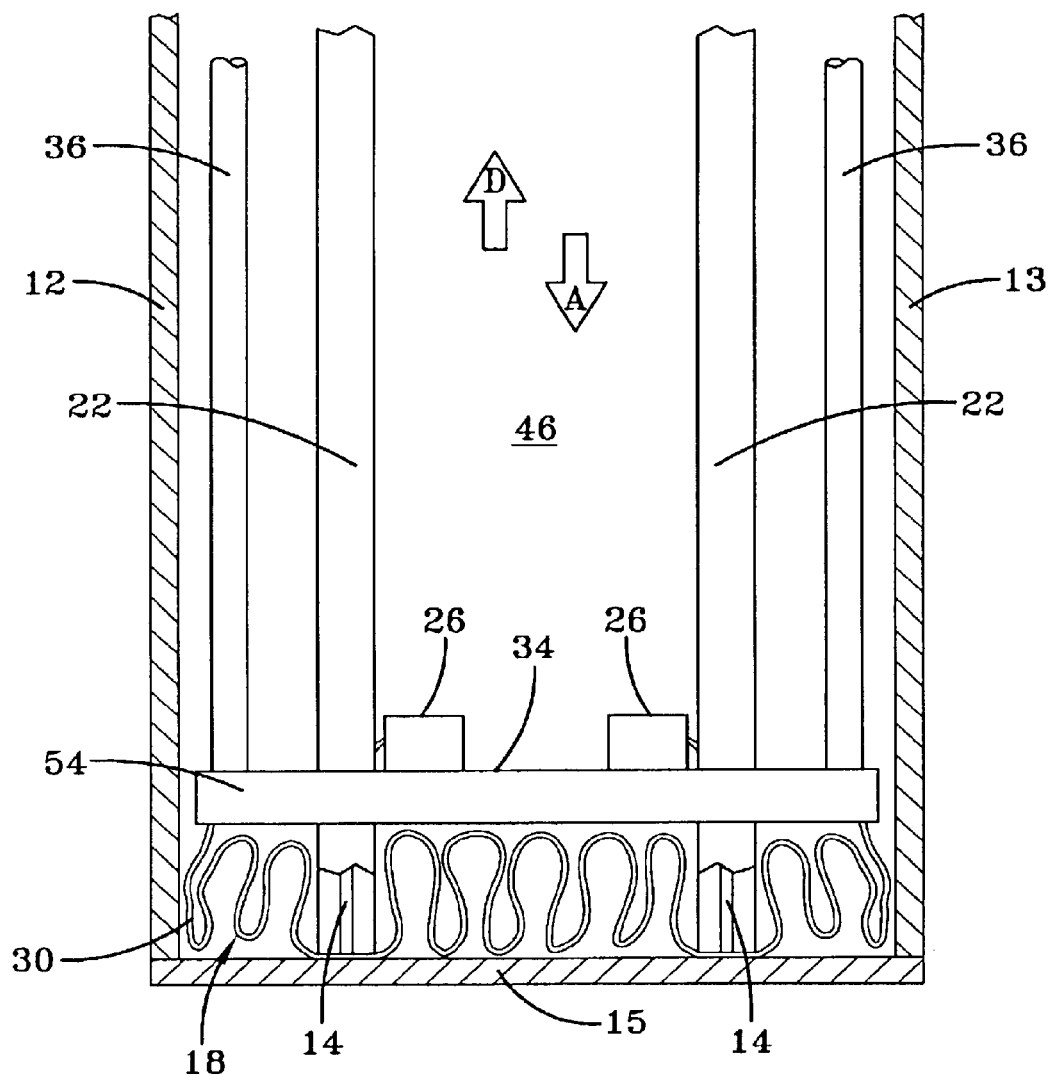
FIG. 2 illustrates the folding of the airbag using the apparatus of FIG. 1.

As noted previously, it is important to know the position of the lines 14 for the sensors within the sensor housing 26 to accurately determine the speed of deployment of the airbag 18 during a vehicle crash and thereby judge the location of a vehicle occupant in relation to the airbag. Compressing the airbag 18 with the plate 54 might cause the line 14 to fold into folds of the airbag 18. However, in contrast to existing airbag folding devices and methods, the airbag folding apparatus 10 has guides 22 disposed within the folding chamber 46 to protect the lines 14 from being folded into the folds of the airbag 18. Consequently, as shown in FIG. 2, when the plate 54 is moved in the direction indicated in the drawing by an arrow A to compress the airbag 18, folds 30 are created without disturbing the location of the lines 14. Moreover, as the airbag 18 is compressed to create airbag folds 30, the line 14 is fed into the sensor housing 26 to take up any slack in these lines and secure their location. As the airbag 18 is compressed and folded by the plate 54 the lines 14 are reeled into the sensor housing 26.

Figure 3:
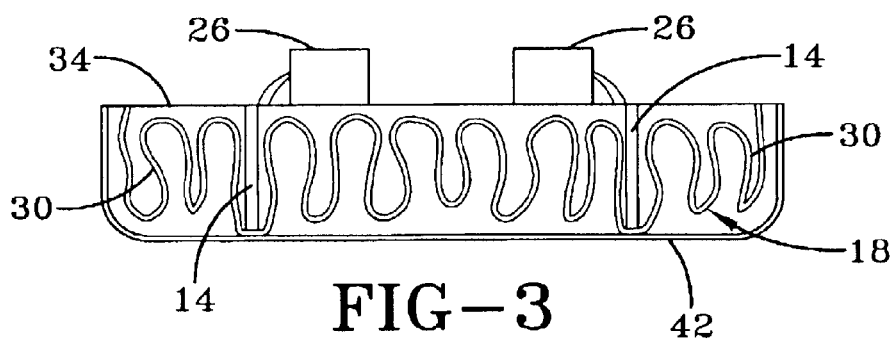
FIG. 3 illustrates a wrapped and folded airbag compacted by the apparatus of FIGS. 1 and 2.

When the airbag 18 is completely folded and compacted, the plate 54 is withdrawn from the folding chamber 46 by moving the push rods 36 in the direction indicated in the drawing by an arrow D. In addition, the guides 22 are pulled out of the airbag 18. Then, as shown in FIG. 3, the airbag 18 is removed from the folding chamber 46, and wrapped with a cover 42, such as a commercially available polymer wrap known as TYVEK®. The airbag 18 with the sensor housing 26 and lines 14 is then ready to be inserted into a housing as part of an airbag module.

Figure 4:
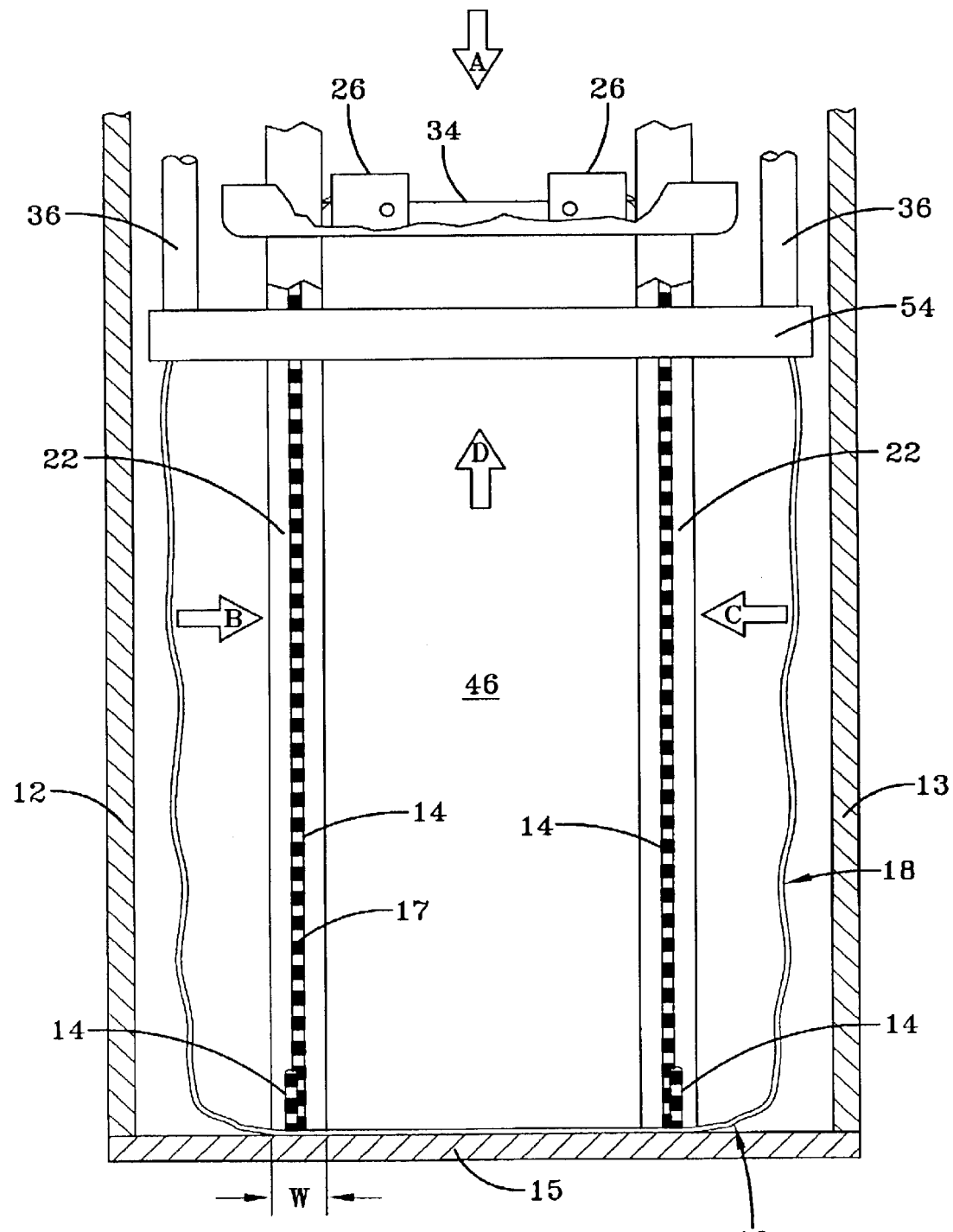
FIG. 4 is an alternative view of the apparatus of FIG. 1, highlighting guides and sensor tapes.

FIG. 4 illustrates how the guides 22 surround the line s 14 to protect them from being disturbed by the folds of the airbag 18. As shown, the airbag 18 is positioned between a plate 54 and the third wall 15 of the folding chamber. Extending through an opening in the plate 54 are four lines 14, which are attached to the airbag 18 at the front of airbag 19. As noted, the lines 14 have an optical pattern 17 that permits an optical sensor within the sensor housing 26 to gauge the rate of extension of the line 14 during airbag deployment. To protect the lines 14 from being enveloped by airbag folds 30, guides 22 are placed around each line 14 to thereby prevent the intrusion of airbag folds into the space protected by the guides 22. Accordingly, the airbag folds 30 are prevented from moving into the direction indicated in the drawings by arrows B and C because the guides 22 are rigid. The guides 22 form a protective sleeve against movement of the airbag 18 in the directions indicated in FIG. 4 by arrow B and arrow C. Thus, when the airbag 18 compresses in the direction indicted by arrow A, the airbag folds 30 moving in the direction indicated by arrows B and C will not intrude into the area protected by the guides 22.

FIGS. 4 and 5 show a retaining ring 34 that is used to retain the airbag 18 in the folded condition. The retaining ring 34 has sensor housings 26 attached thereto to receive the lines 14. During the folding process, the retaining ring 34 is moved with the plate 54 (although shown here removed from the plate 54 for illustration purposes). As the airbag 18 is folded and compressed by the plate 54 and retaining ring 34, the line 14 is fed in the direction indicated by arrow D into the sensor housing 26. In this way, the line 14 can remain taut and extended over the guide 22 so that the line 14 does not extend outside of the guide 22 and thereby become enveloped with the airbag folds 30.

FIG. 5 is a top view of the airbag folding apparatus 10, showing the first wall 12, the second wall 13, as well as the fourth wall 21 and fifth wall 25 of the folding chamber. From this vantage point, it can be seen that the airbag folding apparatus 10 has a rectangular folding chamber. Received within the rectangular folding chamber are a plate 54 with attached push rods 36, guides 22, a retaining ring 34, sensor housings 26 mounted to the retaining ring 34, and lines 14 received in the guides 22 and fed into the sensor housing 26, and an airbag 18 that is visible through a cutout in the retaining ring.

As shown, the plate 54 has a cutout space therein to receive the retaining ring 34 as well as the guides 22. The guides 22 and retaining ring 34 may be removed from the plate 54 because they are not permanently attached to the plate. However, the retaining ring 34 is temporary attached to the plate 54 through the use of an electromagnet or a gripping device to prevent it from moving relative to the plate 54 during folding of the cushion 18. Also, the guides 22 are secured against movement in the x-y plane as shown by holes 71 formed at the boundary between the retaining ring 34 and the plate 54 such that portions of each hole are formed in each of the retaining ring and the plate. The guides 22 may also be secured in this plane by other known means. Nevertheless, the guides 22 are free to be withdrawn from the folding chamber 46. Thus, following the folding and compacting process, the plate 54 may be removed from the folding chamber 42, and the retaining ring 34 may be removed from the plate 54 following release of the electromagnet or gripping mechanism. In addition, the guides 22 may also be removed leaving only the airbag 18, retaining ring 34, lines 14, and sensor housings 26 in the folding chamber.

As shown in FIG. 6A, the guides 22 resemble a rod with a circular cross-section cut in half to form a first guide element 66 and a second guide element 70. Prior to folding the airbag 18, the first guide element 66 and second guide element 70 are disposed around the line 14 so as to protect against the intrusion of airbag folds 30. Also, neither the first guide element 66 nor the second guide element 70 is attached to any feature of the airbag folding apparatus 10. In this way, the first guide element 66 and second guide element 70 may be withdrawn from a folded airbag 18 by simply withdrawing these structures along the length of the line 14 from the airbag 18 through the holes 71 defined cooperatively by the plate and the retaining ring. A set of parallel side walls 100 and 102 serve to separate the two guide elements 66 and 70 so that they cannot compress tape 14, preventing it from being folded. As can be appreciated, a guide 22 can take other shapes such as two parallel bars, two triangular-shaped rods, etc. On such alternative guide is shown in FIG. 6B. In this embodiment, the guides 22 take the form of a hollow tube 104 that has a slot 106 cut into the side.

Figure 7:
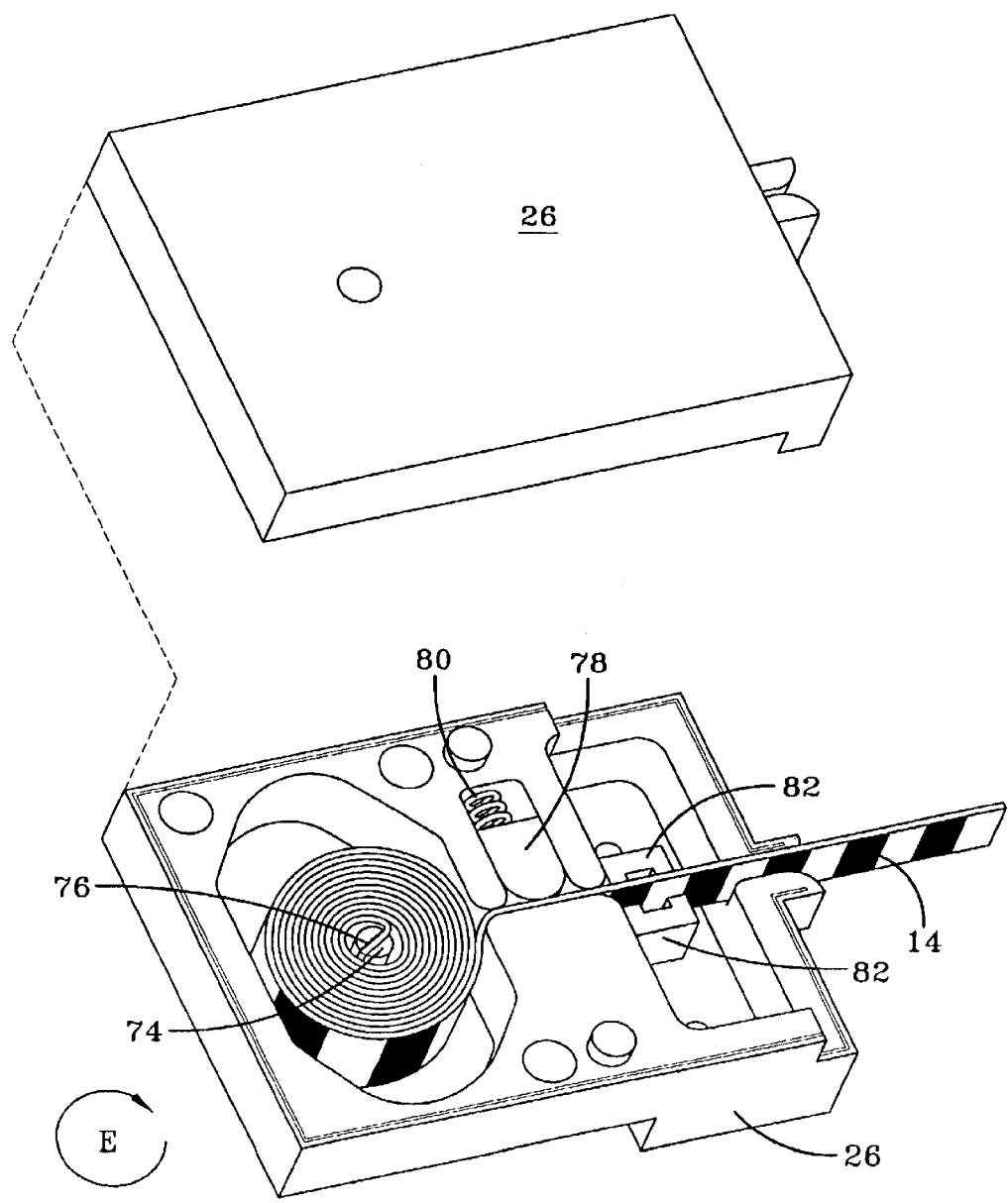
FIG. 7 illustrates a sensor housing used with the method and apparatus according to the present invention.
Figure 8:
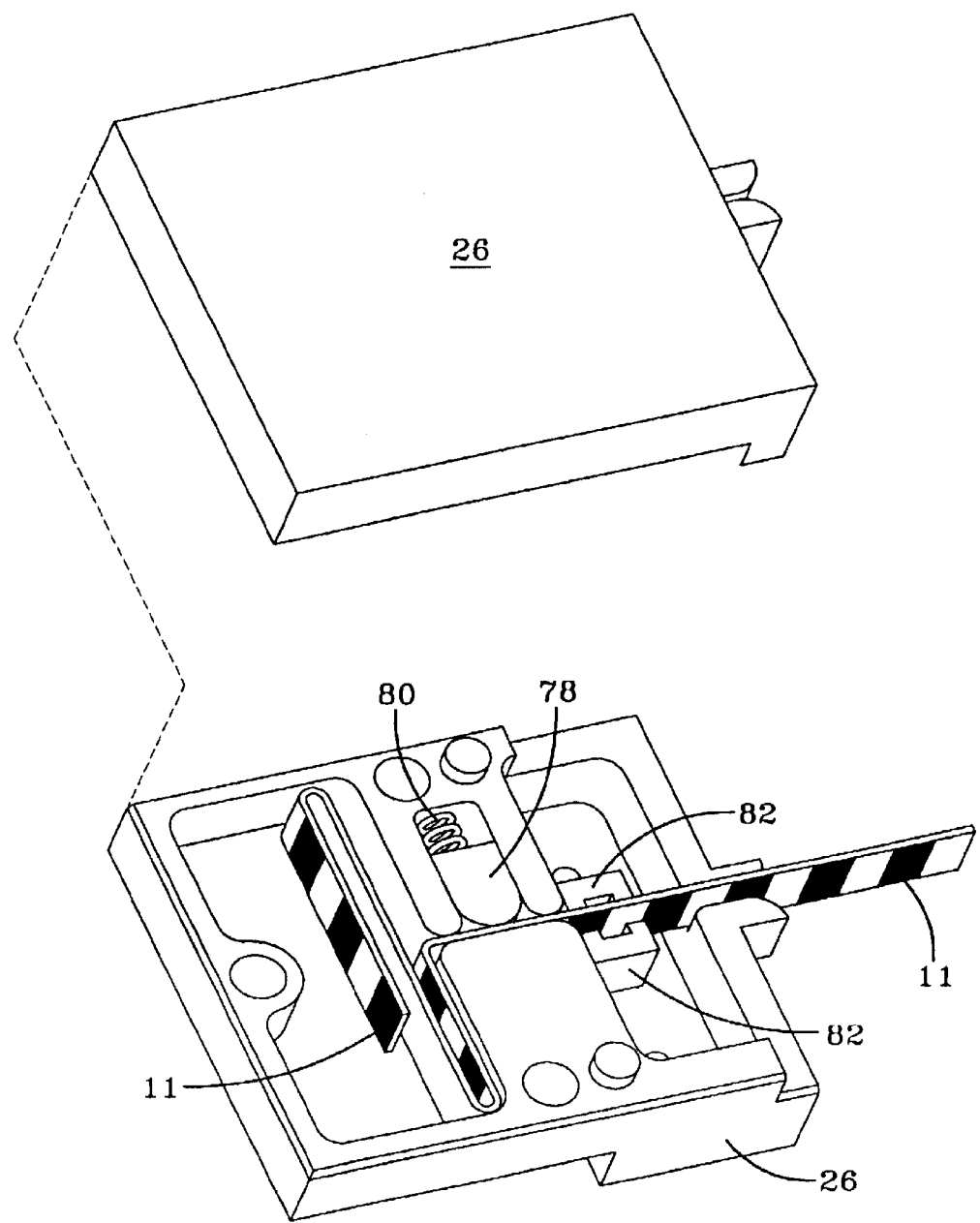
FIG. 8 illustrates an alternative sensor housing used with the method and apparatus according to the present invention.

FIGS. 7 and 8 illustrates two different versions of a sensor housing 26 that may assist in keeping the line 14 within the gap of the guide 22. FIG. 7 illustrates a design in which the line 14 may be reeled or wound into a sensor housing 26. As shown, the sensor housing 26 of FIG. 7 has a central arbor 74 with a slot 76 to receive the line 14. The central arbor 74 may be wound in a clockwise direction as indicated by in the drawing by an arrow E to reel the line 14 into the sensor housing 26. Optionally, the central arbor 74 may comprise two pieces that can be snapped into place around the line 14 so that the line 14 is solidly attached to the arbor 74. A finger brake 78 is attached to a spring 80, which itself is mounted to the sensor housing 26. The finger spring 80 assists in keeping the line 14 within the sensor housing 26 once the line 14 is completely reeled into the sensor housing 26. Also shown are sensors 82, here optical sensors, which read the rate of movement of the line 14.

FIG. 8 shows an alternative design for a sensor housing 26. Here, the sensor tape 11 is simply stored in a zigzag pattern within the sensor housing 26. In this instance, the line 14 is a tether protruding out of the airbag 18 following folding, which is then attached to the sensor tape 11.

Figure 9:
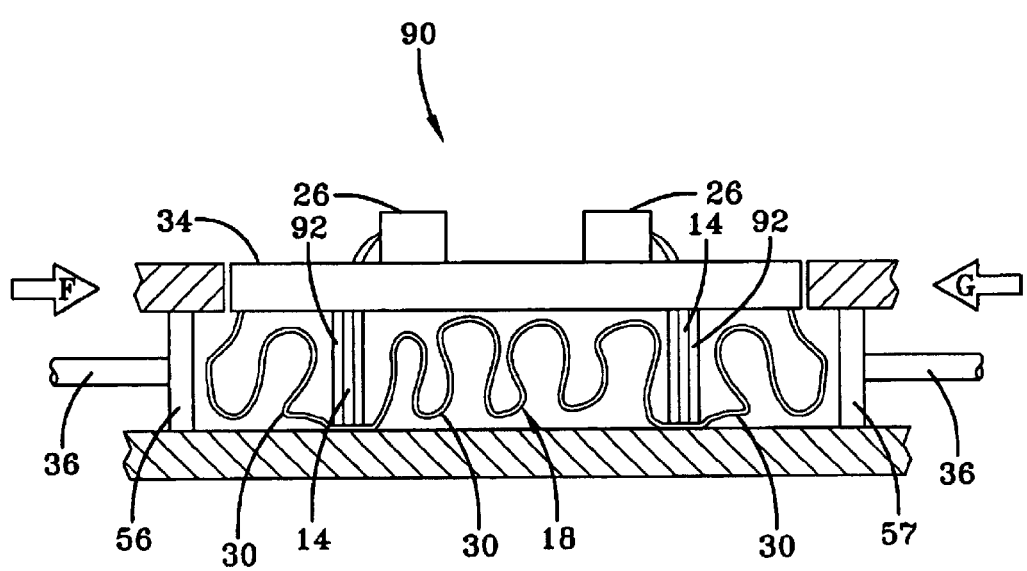
FIG. 9 illustrates an alternative method for folding the airbag.

FIG. 9 illustrates an alternative airbag folding apparatus 90. Like the previous design, the airbag folding apparatus 90 receives an airbag 18 having lines 14 attached to the front thereof. Here, however, the guides 92 in this embodiment are shorter than the guides 22 of the preceding embodiment and are, in fact, the height of a folded airbag 18. Moreover, the airbag folding apparatus 90 has two plates to 56, 57 to fold and compress the airbag 18. Each plate 56, 57 has a push rod 36 that permits the plates to compress and fold the airbag 18 from the sides rather than from the top. Accordingly, the plate 56 may move in the direction indicated in the drawing by an arrow F to compress and fold the airbag 18 while the plate 57 may move in the direction indicated in the drawing by an arrow G to compress and fold the airbag 18. The guides 92 prevent the incursion of folds 30 into the space occupied by the lines 14. Again, the guides 92 provide a protective sleeve from airbag folds 30 so that the lines 14 may have a known position within the airbag 18. This particular design does not require the lines 14 to be fed into a sensor housing 26 as the airbag 18 is folded.

The aforementioned description is exemplary rather that limiting. Many modifications and variations of the present invention are possible in light of the above teachings. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

I claim:

1. A method of folding an airbag, comprising the steps of:
   (a) attaching a line inside the airbag to a front side of the airbag;
   (b) extending the line through an elongated guide; and
   (c) folding and compacting the airbag around the guide and the line while preventing the line from being placed within the folds of the airbag.

2. The method of claim 1 further including the step of: (d) attaching the line to a sensor tape.

3. The method of claim 1 further including the step of: (e) placing the line in communication with a sensor.

4. The method of claim 3 wherein the line comprises a flexible element having a pattern readable by an optical sensor.

5. The method of claim 1 wherein airbag folds are separated from the line by the guide.

6. The method of claim 1 including the step of: (f) feeding the line into a housing.

7. The method of claim 6 wherein step (f) comprises reeling the line into a housing.

8. The method of claim 1 wherein compacting and folding of the airbag occurs in a direction along the guide.

9. The method of claim 1 wherein compacting and folding of the airbag occurs in a direction transverse to the guide.

10. The method of claim 1 including the step of: (g) removing the guide from the airbag.

11. A method of folding an airbag, comprising the steps of:
    (a) attaching a line inside the airbag to a front side of the airbag;
    (b) extending the line through an elongated guide;
    (c) compacting and folding the airbag around the guide and the line;
    (d) creating airbag folds separated from the line such that the line is not located in the airbag folds;
    (e) feeding the line into a housing; and
    (f) placing the line in communication with a sensor.

12. The method of claim 11 wherein step (e) comprises reeling the line into a housing.

13. The method of claim 11 wherein compacting and folding of the airbag occurs while feeding the line into the housing.

14. The method of claim 11 wherein step (c) occurs in conjunction with step (e).

15. The method of claim 11 including the step of: (g) wrapping the airbag with a cover.

16. An airbag folding apparatus, comprising;
    an airbag having at least one line inside and attached to a front side of the airbag folding chamber for receiving an airbag;
    at least one plate movable within said chamber to compress said airbag; and
    at least one pair of elongated guide members spaced within said chamber, each of said elongated guide members having a longitudinal space therein to receive the line for preventing the line from being placed within folds of the airbag as the airbag is folded and compacted by said plate.

17. The airbag folding apparatus of claim 16 wherein said at least one plate comprises a first surface and a second surface and said at least one direction comprises a first direction and a second direction.

18. The airbag folding apparatus of claim 17 wherein said first direction is generally opposite said second direction.

* * * * *